United States Patent
Hwang et al.

(10) Patent No.: US 9,832,684 B2
(45) Date of Patent: Nov. 28, 2017

(54) CONTROL OF OFFLOADING BY THE NETWORK

(71) Applicant: Nokia Solutions and Networks Oy, Espoo (FI)

(72) Inventors: Woonhee Hwang, Espoo (FI); Hanns Jürgen Schwarzbauer, Gröbenzell (DE); Gyorgy Tamas Wolfner, Budapest (HU)

(73) Assignee: Nokia Solutions and Networks Oy, Espoo (FI)

( * ) Notice: Subject to any disclaimer, the term of this patent is extended or adjusted under 35 U.S.C. 154(b) by 64 days.

(21) Appl. No.: 14/783,103

(22) PCT Filed: Apr. 8, 2013

(86) PCT No.: PCT/EP2013/057314
§ 371 (c)(1),
(2) Date: Oct. 8, 2015

(87) PCT Pub. No.: WO2014/166520
PCT Pub. Date: Oct. 16, 2014

(65) Prior Publication Data
US 2016/0073297 A1     Mar. 10, 2016

(51) Int. Cl.
*H04W 4/00* (2009.01)
*H04W 36/00* (2009.01)
(Continued)

(52) U.S. Cl.
CPC ........ *H04W 36/0011* (2013.01); *H04W 76/04* (2013.01); *H04W 36/14* (2013.01); *H04W 84/12* (2013.01)

(58) Field of Classification Search
CPC . H04W 36/0011; H04W 76/04; H04W 36/14; H04W 84/12
See application file for complete search history.

(56) References Cited

U.S. PATENT DOCUMENTS

2012/0269134 A1* 10/2012 Jin ................ H04W 28/085
   370/328
2013/0070594 A1*  3/2013 Garcia Martin ...... H04W 28/08
   370/235
(Continued)

FOREIGN PATENT DOCUMENTS

EP     2 571 311 A1    3/2013
EP     2 709 418 A2    3/2014
WO   WO 2011/157129 A2   12/2011

OTHER PUBLICATIONS

Janne Tervonen: "Deliverable DA2.2.22 Offloading Traffic from Cellular Networks with PBRM", Internet Citation, Jun. 30, 2010 (Jun. 30, 2010), pp. XP007919691, Retrieved from the Internet: URL:http://www.futureinternet.fi [retrieved on Oct. 19, 2011] p. 20, paragraph 1-paragraph [4.2.2].

(Continued)

*Primary Examiner* — Abdelnabi O Musa
(74) *Attorney, Agent, or Firm* — Harrington & Smith

(57) ABSTRACT

It is provided a method, including checking if a first condition for an offloading a first radio access bearer of a first radio access network of a first radio access technology to a second radio access network of a second radio access technology different from the first radio access technology is fulfilled, wherein the first condition is received for the first radio access bearer, and wherein the first condition includes a grouping information; preventing the offloading of the first radio access bearer to the second radio access network if the first condition is fulfilled.

20 Claims, 6 Drawing Sheets

(51) Int. Cl.
*H04W 76/04* (2009.01)
*H04W 36/14* (2009.01)
*H04W 84/12* (2009.01)

(56) References Cited

U.S. PATENT DOCUMENTS

| | | | | |
|---|---|---|---|---|
| 2013/0242965 | A1* | 9/2013 | Horn | H04W 24/10 370/338 |
| 2014/0003239 | A1* | 1/2014 | Etemad | H04W 28/08 370/235 |
| 2014/0301360 | A1* | 10/2014 | Bontu | H04W 36/0083 370/331 |
| 2014/0341038 | A1* | 11/2014 | Lim | H04W 28/08 370/235 |

OTHER PUBLICATIONS

3GPP TSG-RAN Meeting #58 RP-122038 Barcelona, Spain, Dec. 4-7, 2012; Intel Corporation; New Study Item Proposal on WLAN/3GPP Radio Interworking; whole document (6 pages).

3GPP TS 25.413 V11.3.0 (Mar. 2013); 3rd Generation Partnership Project; Technical Specification Group Radio Access Network; UTRAN Iu interface Radio Access Network Application Part (RANAP) signaling (Release 11); whole document (441 pages).

3GPP TS 36.413 V11.3.0 (Mar. 2013); 3rd Generation Partnership Project; Technical Specification Group Radio Access Network; Evolved Universal Terrestrial Radio Access Network (E-UTRAN); S1 Application Protocol (S1AP) (Release 11); whole document (274 pages).

* cited by examiner

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| eNB UE S1AP ID | M | | 9.2.3.4 | | YES | reject |
| UE Aggregate Maximum Bit Rate | O | | 9.2.1.20 | | YES | reject |
| E-RAB to be Setup List | | 1 | | | YES | reject |
| >E-RAB To Be Setup Item IEs | | 1 .. <maxnoof E-RABs> | | | EACH | reject |
| >>E-RAB ID | M | | 9.2.1.2 | | - | |
| >>E-RAB Level QoS Parameters | M | | 9.2.1.15 | Includes necessary QoS parameters. | - | |
| >>Transport Layer Address | M | | 9.2.2.1 | | - | |
| >>GTP-TEID | M | | 9.2.2.2 | EPC TEID. | - | |
| >>NAS-PDU | M | | 9.2.3.5 | | - | |
| >>Correlation ID | O | | 9.2.1.80 | | YES | ignore |
| >>WLAN Group ID | | | | | | |

Fig. 2

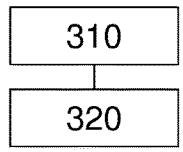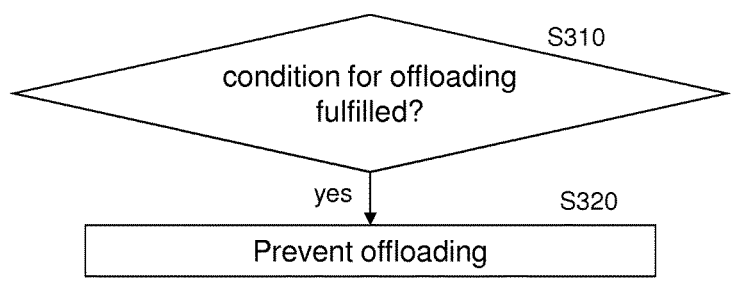
Fig. 7
Fig. 8
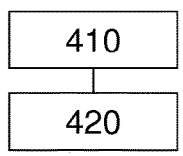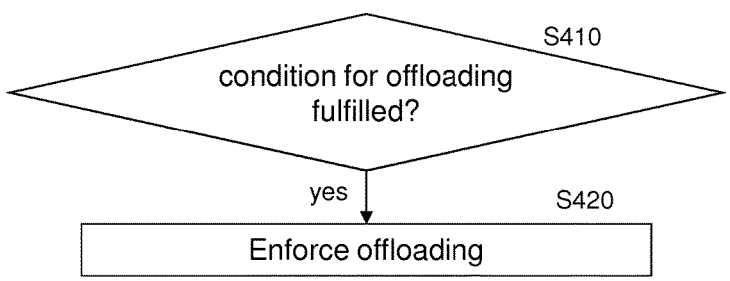
Fig. 9
Fig. 10

CONTROL OF OFFLOADING BY THE NETWORK

FIELD OF THE INVENTION

The present invention relates to an apparatus, a method, a system, and a computer program product for offloading. More particularly, the present invention relates to an apparatus, a method, a system, and a computer program product for control of offloading.

BACKGROUND OF THE INVENTION

Abbreviations
3G $3^{rd}$ Generation
3GPP $3^{rd}$ Generation Partnership Project
4G $4^{th}$ Generation
ANDSF Access Network Discovery and Selection Function
AP Access Point
APN Access Point Name
CN Core Network
DSMIPv6 Dual Stack Mobile IP version 6
eNB enhanced Node B
EPC Evolved Packet Core
EPS Evolved Packet System
E-RAB E-UTRAN RAB
E-UTRAN Evolved UTRAN
GPRS General Packet Radio Service
GTP GPRS Tunneling Protocol
HESSID Homogeneous Extended Service Set Identification (IEEE 802.11u)
ID Identifier
IEEE Institute of Electrical and Electronics Engineers
IFOM IP flow mobility and seamless offload
IMS IP Multimedia Subsystem
IP Internet Protocol
LTE™ Long Term Evolution
MAPCON Multi Access PDN connectivity
MME Mobility Management Entity
NAS Non-Access Stratum
PDN Packet Data Network
PDU Protocol Data Unit
PGW PDN Gateway
QCI QoS Class identifier
QoS Quality of Service
RAB Radio Access Bearer
RAN Radio Access Network
RNC Radio Network Controller
RRC Radio Resource Control
S1AP S1 Application Protocol
SaMOG S2a Mobility over GTP
SGSN Serving GPRS Support Node
SGW Serving Gateway
SSID Service Set Identifier
TEID Tunnel Endpoint ID
UE User Equipment
UMTS Universal Mobile Telecommunication System
UTRAN UMTS RAN
WiFi™ synonymously used for WLAN
WLAN Wireless Local Area Network WLAN/3GPP radio interworking is a 3GPP Study Item whose objective is described in RP-122038 (RAN Plenary #58, December 2012). 3GPP radio covers both LTE and UMTS (UTRAN).

Some operators want to integrate WLAN as an additional access network technology and also as backup of 3GPP cellular radio, and want to have tighter control over it. Operators want to utilize WLAN as much as possible when it is available while not pushing UEs to WLAN when WLAN is congested. Currently it is up to UE to select radio technology between WLAN and cellular, and operators can influence the selection via the policies in the ANDSF. However, some operators want to have more strict control of WLAN and cellular usage.

FIG. 1 shows an example architecture where WLAN offloading may be implemented. The UE on the left side is connected to both the 3GPP access network (UTRAN or LTE), and to WLAN. 3GPP Access network is connected via PGW of 3GPP Core network to an IP network (e.g. IP network 1). WLAN is connected via PGW to IP network 2. In addition, WLAN may be connected directly to some IP network. The IP networks may be different or the same, such as the Internet.

According to the current specifications, PDN connection based (also known as MAPCON) and flow based (also known as IFOM) mobility between 3GPP RAN and WLAN is supported, but flow based mobility is only supported when DSMIPv6 is (via S2c interface) is used as a mobility protocol. Over the S2c interface, the user plane is provided with related control and mobility support between UE and the PDN GW of the core network. Currently, no deployment using DSMIPv6 as mobility protocol is known and therefore, a RAN based solution for the control should preferably not be built on top of that.

SUMMARY OF THE INVENTION

It is an object of the present invention to improve the prior art. In detail, it is an object to let the network control offloading.

According to a first aspect of the invention, there is provided an apparatus, comprising creating means adapted to create a first condition based on a first indication comprised in a request to set up or to modify a packet data connection of a user device of a first radio access network of a first technology, wherein the request is received from a core device, and the first condition comprises a condition for offloading a first radio access bearer of the first technology to a second radio access network of a second technology different from the first technology is allowed, wherein the first radio access bearer is provided by the apparatus for the packet data connection of the user device; indicating means adapted to indicate the first condition to the user device.

According to a second aspect of the invention, there is provided an apparatus, comprising creating processor adapted to create a first condition based on a first indication comprised in a request to set up or to modify a packet data connection of a user device of a first radio access network of a first technology, wherein the request is received from a core device, and the first condition comprises a condition for offloading a first radio access bearer of the first technology to a second radio access network of a second technology different from the first technology is allowed, wherein the first radio access bearer is provided by the apparatus for the packet data connection of the user device; indicating processor adapted to indicate the first condition to the user device.

According to a third aspect of the invention, there is provided an apparatus, comprising creating means adapted to create a first condition based on a first indication comprised in a request to set up or to modify a packet data connection of a user device of a first radio access network of a first technology, wherein the request is received from a core device, and the first condition comprises a condition for offloading a first radio access bearer of the first technology to a second radio access network of a second technology different from the first technology, wherein the first radio access bearer is provided by the apparatus for the packet data connection of the user device; checking means adapted to check if the first radio access bearer fulfills the first condition; indicating means adapted to indicate an identification of the first radio access bearer to the user device if the first condition is satisfied.

The apparatus may further comprise prohibiting means adapted to prohibit the indicating means to indicate the identification of the first radio access bearer if the first radio access bearer does not fulfill the first condition.

According to a fourth aspect of the invention, there is provided an apparatus, comprising creating processor adapted to create a first condition based on a first indication comprised in a request to set up or to modify a packet data connection of a user device of a first radio access network of a first technology, wherein the request is received from a core device, and the first condition comprises a condition for offloading a first radio access bearer of the first technology to a second radio access network of a second technology different from the first technology, wherein the first radio access bearer is provided by the apparatus for the packet data connection of the user device; checking processor adapted to check if the first radio access bearer fulfills the first condition; indicating processor adapted to indicate an identification of the first radio access bearer to the user device if the first condition is satisfied.

The apparatus may further comprise prohibiting processor adapted to prohibit the indicating processor to indicate the identification of the first radio access bearer if the first radio access bearer does not fulfill the first condition.

In the apparatus according to any of the first to fourth aspects, the first indication may comprise an indication of a quality of service class for the packet data connection in the first radio access network, and the first condition may be based on the quality of service class; and/or the first indication may comprise a group identification of the first radio access bearer in the first technology network.

In the apparatus according to any of the first to fourth aspects, the creating means or creating processor may be adapted to create a second condition based on a second indication received from the core device, the indicating means may be adapted to indicate the second condition to the user device; and at least one of the second indication may comprise whether or not the first radio access bearer may be offloaded at all; the second indication may indicate whether or not the first radio access bearer may be offloaded to a specific one of a plurality of technologies including the second technology, each of which being different from the first technology; the second indication may indicate whether or not the first radio access bearer may be offloaded to a specific one of a plurality of radio access networks of the second technology, wherein the plural radio access networks comprise the second radio access network; and the second indication may indicate that the first radio access bearer must be offloaded only together with a second radio access bearer of the first technology different from the first radio access bearer.

In the apparatus according to any of the first to fourth aspects, the first indication may be comprised in an information element of the request dedicated to the condition.

According to a fifth aspect of the invention, there is provided a radio controller comprising an apparatus according to any of the first to fourth aspects.

According to a sixth aspect of the invention, there is provided an apparatus, comprising checking means adapted to check if a first condition for an offloading a first radio access bearer of a first radio access network of a first radio access technology to a second radio access network of a second radio access technology different from the first radio access technology is fulfilled, wherein the first condition is received for the first radio access bearer, and wherein the first condition comprises a grouping information; preventing means adapted to prevent the offloading of the first radio access bearer to the second radio access network if the first condition is fulfilled.

In the apparatus, the first condition may comprise an indicator of a quality of service class, the checking means may be further adapted to check if the first radio access bearer has the quality of service class, and the preventing means may be adapted to prevent the offloading if the first radio access bearer has the quality of service class.

In the apparatus, the first condition may comprise a group identification; the checking means may be further adapted to check if the first radio access bearer has the group identification; and the preventing means may be adapted to prevent the offloading if the first radio access bearer has the group identification.

The apparatus may further comprise first identifying means adapted to identify a second radio access bearer of the first technology different from the first radio access bearer and fulfilling the first condition; wherein the preventing means may be adapted to prevent the offloading of the first radio access bearer and the second radio access bearer if one of the first radio access bearer and the second radio access bearer is not allowed to be offloaded.

In the apparatus, the first identifying means may be adapted to identify each of a set of second radio access bearers, each being different from the first radio access bearer and fulfilling the first condition; the preventing means may be adapted to prevent the offloading of the first radio access bearer and of each of the second radio access bearers if one of the first radio access bearer and the second radio access bearers is not allowed to be offloaded.

According to a seventh aspect of the invention, there is provided an apparatus, comprising checking processor adapted to check if a first condition for an offloading a first radio access bearer of a first radio access network of a first radio access technology to a second radio access network of a second radio access technology different from the first radio access technology is fulfilled, wherein the first condition is received for the first radio access bearer, and wherein the first condition comprises a grouping information; preventing processor adapted to prevent the offloading of the first radio access bearer to the second radio access network if the first condition is fulfilled.

In the apparatus, the first condition may comprise an indicator of a quality of service class, the checking processor may be further adapted to check if the first radio access bearer has the quality of service class, and the preventing processor may be adapted to prevent the offloading if the first radio access bearer has the quality of service class.

In the apparatus, the first condition may comprise a group identification; the checking processor may be further adapted to check if the first radio access bearer has the group identification; and the preventing processor may be adapted to prevent the offloading if the first radio access bearer has the group identification.

The apparatus may further comprise first identifying processor adapted to identify a second radio access bearer of the first technology different from the first radio access bearer and fulfilling the first condition; wherein the preventing processor may be adapted to prevent the offloading of the first radio access bearer and the second radio access bearer if one of the first radio access bearer and the second radio access bearer is not allowed to be offloaded.

In the apparatus, the first identifying processor may be adapted to identify each of a set of second radio access bearers, each being different from the first radio access bearer and fulfilling the first condition; the preventing processor may be adapted to prevent the offloading of the first radio access bearer and of each of the second radio access bearers if one of the first radio access bearer and the second radio access bearers is not allowed to be offloaded.

According to an eighth aspect of the invention, there is provided an apparatus, comprising checking means adapted to check if a first condition for an offloading a first radio access bearer of a first radio access network of a first radio access technology to a second radio access network of a second radio access technology different from the first radio access technology is fulfilled, wherein the first condition is received for the first radio access bearer, and wherein the first condition comprises a grouping information; enforcing means adapted to enforce the offloading of the first radio access bearer to the second radio access network if the first condition is fulfilled.

In the apparatus, the first condition may comprise an indicator of a quality of service class, the checking means may be further adapted to check if the first radio access bearer has the quality of service class, and the enforcing means may be adapted to enforce the offloading if the first radio access bearer has the quality of service class.

In the apparatus, the first condition may comprise a group identification; the checking means may be further adapted to check if the first radio access bearer has the group identification; and the enforcing means may be adapted to enforce the offloading if the first radio access bearer has the group identification.

The apparatus may further comprise first identifying means adapted to identify a second radio access bearer of the first technology different from the first radio access bearer and fulfilling the first condition; wherein the enforcing means may be adapted to enforce the offloading of the first radio access bearer and the second radio access bearer if both of the first radio access bearer and the second radio access bearer are allowed to be offloaded.

In the apparatus, the first identifying means may be adapted to identify each of a set of second radio access bearers, each being different from the first radio access bearer and fulfilling the first condition; wherein the enforcing means may be adapted to enforce the offloading of the first radio access bearer and of each of the second radio access bearers if all of the first radio access bearer and the second radio access bearers are allowed to be offloaded.

According to a ninth aspect of the invention, there is provided an apparatus, comprising checking processor adapted to check if a first condition for an offloading a first radio access bearer of a first radio access network of a first radio access technology to a second radio access network of a second radio access technology different from the first radio access technology is fulfilled, wherein the first condition is received for the first radio access bearer, and wherein the first condition comprises a grouping information; enforcing processor adapted to enforce the offloading of the first radio access bearer to the second radio access network if the first condition is fulfilled.

In the apparatus, the first condition may comprise an indicator of a quality of service class, the checking processor may be further adapted to check if the first radio access bearer has the quality of service class, and the enforcing processor may be adapted to enforce the offloading if the first radio access bearer has the quality of service class.

In the apparatus, the first condition may comprise a group identification; the checking processor may be further adapted to check if the first radio access bearer has the group identification; and the enforcing processor may be adapted to enforce the offloading if the first radio access bearer has the group identification.

The apparatus may further comprise first identifying processor adapted to identify a second radio access bearer of the first technology different from the first radio access bearer and fulfilling the first condition; wherein the enforcing processor may be adapted to enforce the offloading of the first radio access bearer and the second radio access bearer if both of the first radio access bearer and the second radio access bearer are allowed to be offloaded.

In the apparatus, the first identifying processor may be adapted to identify each of a set of second radio access bearers, each being different from the first radio access bearer and fulfilling the first condition; wherein the enforcing processor may be adapted to enforce the offloading of the first radio access bearer and of each of the second radio access bearers if all of the first radio access bearer and the second radio access bearers are allowed to be offloaded.

According to a tenth aspect of the invention, there is provided an apparatus, comprising monitoring means adapted to monitor if a first identification of a first radio access bearer of a first radio access network of a first radio access technology is received; preventing means adapted to prevent an offloading of the first radio access bearer to a second radio access network of a second radio access technology different from the first radio access technology if the first identification is received.

In the apparatus, the monitoring means may be adapted to monitor if a second identification of a second radio access bearer of the first radio access network is received together with the first identification, wherein the first radio access bearer is different from the second radio access bearer; and the preventing means may be adapted to prevent the offloading of both of the first radio access bearer and the second radio access bearer if the first identification and the second identification are received together and one of the first radio access bearer and the second radio access bearer is not allowed to be offloaded.

According to a eleventh aspect of the invention, there is provided an apparatus, comprising monitoring processor adapted to monitor if a first identification of a first radio access bearer of a first radio access network of a first radio access technology is received; preventing processor adapted to prevent an offloading of the first radio access bearer to a second radio access network of a second radio access technology different from the first radio access technology if the first identification is received.

In the apparatus, the monitoring processor may be adapted to monitor if a second identification of a second radio access bearer of the first radio access network is received together with the first identification, wherein the first radio access bearer is different from the second radio access bearer; and the preventing processor may be adapted to prevent the offloading of both of the first radio access bearer and the second radio access bearer if the first identification and the second identification are received together and one of the first radio access bearer and the second radio access bearer is not allowed to be offloaded.

According to a twelfth aspect of the invention, there is provided an apparatus, comprising monitoring means adapted to monitor if an identification of a first radio access bearer of a first radio access network of a first radio access technology is received; enforcing means adapted to enforce an offloading of the first radio access bearer to a second radio access network of a second radio access technology different from the first radio access technology if the first condition is fulfilled.

In the apparatus, the monitoring means may be adapted to monitor if a second identification of a second radio access bearer of the first radio access network is received together with the first identification, wherein the first radio access bearer is different from the second radio access bearer; and the enforcing means may be adapted to enforce the offloading of both of the first radio access bearer and the second radio access bearer if the first identification and the second identification are received together and one of the first radio access bearer and the second radio access bearer is allowed to be offloaded.

According to a thirteenth aspect of the invention, there is provided an apparatus, comprising monitoring processor adapted to monitor if an identification of a first radio access bearer of a first radio access network of a first radio access technology is received; enforcing processor adapted to enforce an offloading of the first radio access bearer to a second radio access network of a second radio access technology different from the first radio access technology if the first condition is fulfilled.

In the apparatus, the monitoring processor may be adapted to monitor if a second identification of a second radio access bearer of the first radio access network is received together with the first identification, wherein the first radio access bearer is different from the second radio access bearer; and the enforcing processor may be adapted to enforce the offloading of both of the first radio access bearer and the second radio access bearer if the first identification and the second identification are received together and one of the first radio access bearer and the second radio access bearer is allowed to be offloaded.

The apparatus according to any of the sixth to thirteenth aspects may further comprise condition checking means or condition checking processor adapted to check if a second condition for the offloading of the first radio access bearer is received; and inhibiting means or inhibiting processor adapted to inhibit the offloading of the first radio access bearer to the second radio access network if the second condition is not fulfilled. The apparatus may further comprise second identifying means or second identifying processor adapted to identify a second radio access bearer of the first technology different from the first radio access bearer and not fulfilling the second condition; wherein the inhibiting means or the inhibiting processor may be adapted to inhibit the offloading of the first radio access bearer and the second radio access bearer if one of the first radio access bearer and the second radio access bearer does not fulfill the second condition. In the apparatus, the second identifying means or second identifying processor may be adapted to identify each of a set of second radio access bearers, each being different from the first radio access bearer and not fulfilling the second first condition; wherein the inhibiting means or inhibiting processor is adapted to inhibit the offloading of the first radio access bearer and of each of the second radio access bearers if one of the first radio access bearer and the second radio access bearers does not fulfill the second condition.

In the apparatus according to any of the sixth to thirteenth aspects, the second condition may comprises at least one of whether or not the first radio access bearer may be offloaded at all; whether or not the first radio access bearer may be offloaded to a specific one of plural technologies including the second technology, each of which being different from the first technology; and whether or not the first radio access bearer may be offloaded to a specific one of plural radio access networks of the second technology, wherein the plural radio access networks comprise the second radio access network.

The apparatus according to any of the sixth to thirteenth aspects may further comprise monitoring means or monitoring processor adapted to monitor if the offloading of a third radio access bearer of the first technology fulfilling the first condition is terminated; third identifying means or third identifying processor adapted to identify, if the offloading of the third radio access bearer is terminated, a fourth radio access bearer of the first technology fulfilling the first condition, wherein the fourth radio access bearer is offloaded and different from the third radio access bearer; and terminating instructing means or terminating instructing processor adapted to instruct terminating of the offloading of the fourth radio access bearer. In the apparatus, the third identifying means or third identifying processor may be adapted to identify each of a set of plural fourth radio access bearers of the first technology, each being offloaded, fulfilling the first condition, and being different from the third radio access bearer, and the terminating instructing means or terminating instructing processor may be adapted to instruct the terminating of each of the fourth radio access bearers.

According to a fourteenth aspect of the invention, there is provided a user equipment comprising an apparatus according to any of the sixth to thirteenth aspects.

According to a fifteenth aspect of the invention, there is provided an apparatus, comprising requesting means adapted to request a setup or a modification of a first radio access bearer of a first radio access network of a first technology for a packet data network connection, wherein the request comprises an indication about a condition for offloading the first radio access bearer to a second radio access network of a second technology different from the first technology.

The apparatus may further comprise setting means adapted to set the condition based on a property of the packet data connection. In the apparatus, the property may comprise at least one of an access point name on which the packet data connection ends and an application using the packet data connection.

According to a sixteenth aspect of the invention, there is provided an apparatus, comprising requesting processor adapted to request a setup or a modification of a first radio access bearer of a first radio access network of a first technology for a packet data network connection, wherein the request comprises an indication about a condition for offloading the first radio access bearer to a second radio access network of a second technology different from the first technology.

The apparatus may further comprise setting processor adapted to set the condition based on a property of the packet data connection. In the apparatus, the property may comprise at least one of an access point name on which the packet data connection ends and an application using the packet data connection.

In the apparatus of any of the fifteenth and sixteenth aspects, the condition may comprise at least one of whether or not the first radio access bearer may be offloaded at all;

whether or not the first radio access bearer may be offloaded to a specific one of plurality of technologies including the second technology, each of which being different from the first technology; whether or not the first radio access bearer may be offloaded to a specific one of plurality of radio access networks of the second technology, wherein the plurality of radio access networks comprise the second radio access network; that the first radio access bearer must be offloaded only together with a second radio access bearer different from the first radio access bearer; a group identification of the first radio access bearer; and an identifier of a quality of service class received from the core device.

In the apparatus of any of the fifteenth and sixteenth aspects, the condition may be comprised in an information element of the request dedicated to the condition.

In the apparatus according to any of the first to fourth, sixth to thirteenth, fifteenth, and sixteenth aspects, the first technology may be a technology of a third generation partnership project, and the second technology may comprise a wireless local area network.

According to a seventeenth aspect of the invention, there is provided a mobility management entity comprising an apparatus according to any of the fifteenth and sixteenth aspects.

According to an eighteenth aspect of the invention, there is provided a serving gateway comprising an apparatus according to any of the fifteenth and sixteenth aspects.

According to a nineteenth aspect of the invention, there is provided a system, comprising a core network apparatus according to any of the fifteenth and sixteenth aspects; a radio access apparatus according to any of the first and second aspects; a user apparatus according to any of the sixth to ninth aspects; wherein the condition received by the user apparatus comprises the condition indicated by the radio access apparatus; and the request received by the radio access apparatus comprises the request of the core network apparatus.

According to a twentieth aspect of the invention, there is provided a system, comprising a core network apparatus according to any of the fifteenth and sixteenth aspects; a radio access apparatus according to any of the third and fourth aspects; a user apparatus according to any of the tenth to thirteenth aspects; wherein the first identification received by the user apparatus comprises the identification indicated by the radio access apparatus; and the request received by the radio access apparatus comprises the request of the core network apparatus.

According to a twenty-first aspect of the invention, there is provided a method, comprising creating a first condition based on a first indication comprised in a request to set up or to modify a packet data connection of a user device of a first radio access network of a first technology, wherein the request is received from a core device, and the first condition comprises a condition for offloading a first radio access bearer of the first technology to a second radio access network of a second technology different from the first technology is allowed, wherein the first radio access bearer is provided by an apparatus performing the method for the packet data connection of the user device; indicating the first condition to the user device.

According to a twenty-second aspect of the invention, there is provided a method, comprising creating a first condition based on a first indication comprised in a request to set up or to modify a packet data connection of a user device of a first radio access network of a first technology, wherein the request is received from a core device, and the first condition comprises a condition for offloading a first radio access bearer of the first technology to a second radio access network of a second technology different from the first technology, wherein the first radio access bearer is provided by an apparatus performing the method for the packet data connection of the user device; checking if the first radio access bearer fulfills the first condition; indicating an identification of the first radio access bearer to the user device if the first condition is satisfied.

The method may further comprise prohibiting the indicating of the identification of the first radio access bearer if the first radio access bearer does not fulfill the first condition.

In the methods according to any of the twenty-first and twenty-second aspects, the first indication may comprise an indication of a quality of service class for the packet data connection in the first radio access network, and the first condition may be based on the quality of service class; and/or the first indication may comprise a group identification of the first radio access bearer in the first technology network.

The method according to any of the twenty-first and twenty-second aspects may further comprise creating a second condition based on a second indication received from the core device, indicating the second condition to the user device; wherein the second indication comprises at least one of whether or not the first radio access bearer may be offloaded at all; whether or not the first radio access bearer may be offloaded to a specific one of a plurality of technologies including the second technology, each of which being different from the first technology; whether or not the first radio access bearer may be offloaded to a specific one of a plurality of radio access networks of the second technology, wherein the plural radio access networks comprise the second radio access network; and that the first radio access bearer must be offloaded only together with a second radio access bearer of the first technology different from the first radio access bearer.

In the method according to any of the twenty-first and twenty-second aspects, the first indication may be comprised in an information element of the request dedicated to the condition.

According to a twenty-third aspect of the invention, there is provided a method, comprising checking if a first condition for an offloading a first radio access bearer of a first radio access network of a first radio access technology to a second radio access network of a second radio access technology different from the first radio access technology is fulfilled, wherein the first condition is received for the first radio access bearer, and wherein the first condition comprises a grouping information; preventing the offloading of the first radio access bearer to the second radio access network if the first condition is fulfilled.

In the method, the first condition may comprise an indicator of a quality of service class, and the method may further comprise checking if the first radio access bearer has the quality of service class, and preventing the offloading if the first radio access bearer has the quality of service class.

In the method, the first condition may comprise a group identification; and the method may further comprise checking if the first radio access bearer has the group identification; and preventing the offloading if the first radio access bearer has the group identification.

The method may further comprise identifying a second radio access bearer of the first technology different from the first radio access bearer and fulfilling the first condition; preventing the offloading of the first radio access bearer and the second radio access bearer if one of the first radio access bearer and the second radio access bearer is not allowed to be offloaded.

The method may further comprise identifying each of a set of second radio access bearers, each being different from the first radio access bearer and fulfilling the first condition; and preventing the offloading of the first radio access bearer and of each of the second radio access bearers if one of the first radio access bearer and the second radio access bearers is not allowed to be offloaded.

According to a twenty-fourth aspect of the invention, there is provided a method, comprising checking if a first condition for an offloading a first radio access bearer of a first radio access network of a first radio access technology to a second radio access network of a second radio access technology different from the first radio access technology is fulfilled, wherein the first condition is received for the first radio access bearer, and wherein the first condition comprises a grouping information; enforcing the offloading of the first radio access bearer to the second radio access network if the first condition is fulfilled.

In the method, the first condition may comprise an indicator of a quality of service class, and the method may further comprise checking if the first radio access bearer has the quality of service class, and enforcing the offloading if the first radio access bearer has the quality of service class.

In the method, the first condition may comprise a group identification; and the method may further comprise checking if the first radio access bearer has the group identification; and enforcing the offloading if the first radio access bearer has the group identification.

The method may further comprise identifying a second radio access bearer of the first technology different from the first radio access bearer and fulfilling the first condition; enforcing the offloading of the first radio access bearer and the second radio access bearer if both of the first radio access bearer and the second radio access bearer are allowed to be offloaded.

The method may further comprise identifying each of a set of second radio access bearers, each being different from the first radio access bearer and fulfilling the first condition; and enforcing the offloading of the first radio access bearer and of each of the second radio access bearers if all of the first radio access bearer and the second radio access bearers are allowed to be offloaded.

According to a twenty-fifth aspect of the invention, there is provided a method, comprising monitoring if a first identification of a first radio access bearer of a first radio access network of a first radio access technology is received; preventing an offloading of the first radio access bearer to a second radio access network of a second radio access technology different from the first radio access technology if the first identification is received.

The method may further comprise monitoring if a second identification of a second radio access bearer of the first radio access network is received together with the first identification, wherein the first radio access bearer is different from the second radio access bearer; and preventing the offloading of both of the first radio access bearer and the second radio access bearer if the first identification and the second identification are received together and one of the first radio access bearer and the second radio access bearer is not allowed to be offloaded.

According to a twenty-sixth aspect of the invention, there is provided a method, comprising monitoring if an identification of a first radio access bearer of a first radio access network of a first radio access technology is received; enforcing an offloading of the first radio access bearer to a second radio access network of a second radio access technology different from the first radio access technology if the first condition is fulfilled.

The method may further comprise monitoring if a second identification of a second radio access bearer of the first radio access network is received together with the first identification, wherein the first radio access bearer is different from the second radio access bearer; and enforcing the offloading of both of the first radio access bearer and the second radio access bearer if the first identification and the second identification are received together and one of the first radio access bearer and the second radio access bearer is allowed to be offloaded.

The method according to any of the twenty-third to twenty-sixth aspects may further comprise checking if a second condition for the offloading of the first radio access bearer is received; and inhibiting the offloading of the first radio access bearer to the second radio access network if the second condition is not fulfilled. The method may further comprise identifying a second radio access bearer of the first technology different from the first radio access bearer and not fulfilling the second condition; and inhibiting the offloading of the first radio access bearer and the second radio access bearer if one of the first radio access bearer and the second radio access bearer does not fulfill the second condition. The method may further comprise identifying each of a set of second radio access bearers, each being different from the first radio access bearer and not fulfilling the second first condition; and inhibiting the offloading of the first radio access bearer and of each of the second radio access bearers if one of the first radio access bearer and the second radio access bearers does not fulfill the second condition.

In the method according to any of the twenty-third to twenty-sixth aspects, the second condition may comprise at least one of whether or not the first radio access bearer may be offloaded at all; whether or not the first radio access bearer may be offloaded to a specific one of plural technologies including the second technology, each of which being different from the first technology; and whether or not the first radio access bearer may be offloaded to a specific one of plural radio access networks of the second technology, wherein the plural radio access networks comprise the second radio access network;

The method according to any of the twenty-third to twenty-sixth aspects may further comprise monitoring if the offloading of a third radio access bearer of the first technology fulfilling the first condition is terminated; identifying, if the offloading of the third radio access bearer is terminated, a fourth radio access bearer of the first technology fulfilling the first condition, wherein the fourth radio access bearer is offloaded and different from the third radio access bearer; and instructing terminating of the offloading of the fourth radio access bearer. The method may further comprise identifying each of a set of plural fourth radio access bearers of the first technology, each being offloaded, fulfilling the first condition, and being different from the third radio access bearer, and instructing the terminating of each of the fourth radio access bearers.

According to a twenty-seventh aspect of the invention, there is provided a method, comprising requesting a setup or a modification of a first radio access bearer of a first radio access network of a first technology for a packet data network connection, wherein the request comprises an indication about a condition for offloading the first radio access bearer to a second radio access network of a second technology different from the first technology.

In the method, the condition may comprise at least one of whether or not the first radio access bearer may be offloaded at all; whether or not the first radio access bearer may be offloaded to a specific one of plurality of technologies including the second technology, each of which being different from the first technology; whether or not the first radio access bearer may be offloaded to a specific one of plurality of radio access networks of the second technology, wherein the plurality of radio access networks comprise the second radio access network; that the first radio access bearer must be offloaded only together with a second radio access bearer different from the first radio access bearer; a group identification of the first radio access bearer; and an identifier of a quality of service class received from the core device.

In the method, the condition may be comprised in an information element of the request dedicated to the condition.

The method may further comprise setting the condition based on a property of the packet data connection. In the method, the property may comprise at least one of an access point name on which the packet data connection ends and an application using the packet data connection.

In the method according to any of the twenty-first to twenty-seventh aspects, the first technology may be a technology of a third generation partnership project, and the second technology may comprise a wireless local area network.

The method according to any of the twenty-first to twenty-seventh aspects may be a method of control of offloading.

According to a twenty-eighth aspect of the invention, there is provided a computer program product comprising a set of instructions which, when executed on an apparatus, is configured to cause the apparatus to carry out the method according to any one of the twenty-first to twenty-seventh aspects. The computer program product may be embodied as a computer-readable medium.

According to embodiments of the invention, at least one of the following advantages is achieved:
whether or not offloading may take place may be controlled by the network;
some solutions may not involve the core network;
the solution may be flexible;
the solution may take into account different conditions, e.g. related to the PDN connection, different radio access bearers, the APN, the application etc.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein

FIG. 2 shows an E-RAB setup request according to an embodiment of the invention;

FIG. 7 shows an apparatus according to an embodiment of the invention;

FIG. 8 shows a method according to an embodiment of the invention;

FIG. 9 shows an apparatus according to an embodiment of the invention;

FIG. 10 shows a method according to an embodiment of the invention;

DETAILED DESCRIPTION OF CERTAIN EMBODIMENTS

Figure 1:
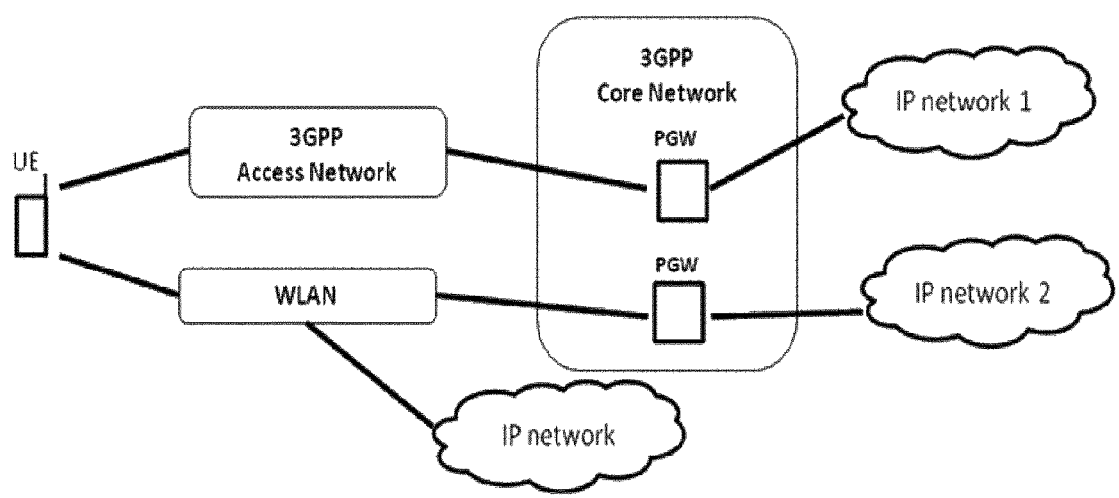
FIG. 1 shows a network architecture in which WLAN offloading according to some embodiments of the invention may be employed.

Herein below, certain embodiments of the present invention are described in detail with reference to the accompanying drawings, wherein the features of the embodiments can be freely combined with each other unless otherwise described. However, it is to be expressly understood that the description of certain embodiments is given for by way of example only, and that it is by no way intended to be understood as limiting the invention to the disclosed details.

Moreover, it is to be understood that the apparatus is configured to perform the corresponding method, although in some cases only the apparatus or only the method are described.

Up to 3GPP Release 11, 3GPP cellular radio networks had no means to control whether WLAN or the 3GPP network is used for a PDN connection. For the cellular operator, to have tighter control, one option is to provide a cellular controller, like eNB or RNC, which makes the decision on which bearers should be served by cellular and which by WLAN. To realize such a controller, all necessary information should be available in the cellular controller.

For instance, cellular network controller cannot make a decision based on the PDN connection as the cellular network does not provide it with the information which bearers belongs to a given PDN connection. Another example is that the cellular network controller does not have information which type of application uses a given bearer and whether the given bearer could be subject of WLAN offloading.

According to some embodiments of the invention, the cellular network controller, e.g. the eNB, makes the decision which bearers may be offloaded to WLAN. E.g., this selection may be done based on QCI.

In a static solution according to some embodiments of the invention, a set of QCI is predefined for WLAN offload purposes. QCI is known to eNB for each PDN connection. For instance, bearers with QCI value "abc"-"def" can be offloaded to WLAN, and other bearers may not be offloaded to WLAN. Thus, an eNB only needs to check the QCI values of the radio bearers to make a decision which bearers are allowed to be offloaded to WLAN.

This solution does not require involvement of the EPS core. Hence, from an architectural point of view, it is relatively simple. However, it has some drawbacks: In case multiple bearers belonging to one PDN connection should be offloaded together, eNB does not have this kind of information. Also if only some of the bearers for a specific application can be offloaded, eNB also does not have this kind of information.

In a more flexible solution according to some embodiments of the invention, CN (e.g, MME or SGSN/SWG) provides at least one of the information whether a RAB is allowed to be offloaded to WLAN e.g. during RAB establishment and/or during subsequent modification procedures, and additional information about WLAN offloading.

Then, according to some embodiments of the invention, the cellular network (e.g. eNB or RNC) may generate a condition based on the information received from the CN, and provides this condition to the UE. The UE may then decide whether or not a certain RAB may be offloaded, based on the received condition.

According to some other embodiments, the cellular network evaluates the information received from CN and decides if a certain RAB may be offloaded or not. Then, the cellular network provides an identification of the RAB(s) to the UE. According to different embodiments, providing of the identification may mean that offloading is prevented for this RAB, or may mean that offloading is allowed for this RAB. Hence, UE only needs to check if an identification of a RAB is received in order to decide on offloading but need not to check the condition itself.

In order to generate such information, CN may evaluate e.g. the APN selected by the UE for the PDN connection: for example, traffic for an APN used for general Internet connection is a candidate for WLAN offloading, while traffic for an APN used for IMS should not be offloaded.

The additional information may for instance include some grouping information according to which a specific RAB is allowed to be offloaded only together with certain other RABs. In this way it can be assured that RABs belonging to the same PDN connection are either offloaded together or not offloaded at all.

As a further example, the information received from the CN can include which RAB can be offloaded to which WLAN based on e.g. HESSID or SSID. Also, it may include an indication, to which WLAN type, such as WLANs supporting SaMOG, offloading of a RAB is allowed. Still furthermore, the information may indicate that the RAB shall not be offloaded to WLAN at all.

Therefore, in some embodiments of the invention, the cellular network controllers like eNB or RNC have information for each RAB whether or not it is allowed to be offloaded to WLAN.

According to some embodiments of the invention, the eNB only based solution (e.g. using QCI) may be combined with the CN based solution in various ways:

E.g., eNB may decide if a RAB is allowed to be offloaded at all and core network provides some additional information like groups of RABs. Also, both eNB (e.g. using QCI) and CN may determine whether offloading of a RAB is allowed, and—if both determinations are available and are in conflict with each other—one or the other of these determinations may have prevalence over the other.

According to some embodiments of the invention, eNB may preferably indicate to UE via one or more RRC messages, which RAB(s) are allowed to be offloaded, and—if available—under which additional condition(s).

An example of an implementation is shown in FIG. 2. The message shown in FIG. 2 may be sent from MME to eNB and is used to request the eNB to assign resources to Uu interface (between base station (NodeB or eNodeB) and UE) and S1 interface (between RNC or eNB and MME) for one or several E-RABs.

The message syntax is the same as that according to TS 36.413 for S1 interface, except that the field WLAN Group ID is additionally specified for each E-RAB. Values of WLAN Group ID may be some integers, like INTEGER (0 . . . 7). One of these values, e.g. value 0, may mean that offload is not allowed at all. For Iu interface, the message syntax will be defined based on TS25.413.

In some embodiments, WLAN group ID may be provided in the message or not. If it is not provided, it may mean that offload is not allowed for that bearer.

The value of WLAN Group ID may be interpreted by eNB and/or UE as a group number of a group or RABs which should be offloaded either together or not at all. More particularly, in some embodiments of the invention, if one of the RABs of a group is to be offloaded, all RABs of the group are offloaded. In some embodiments of the invention, if one of the RABs of a group is forbidden to be offloaded, none of the RABs of the groups may be offloaded.

The message may comprise further fields for each E-RAB. E.g., if the offload is allowed to a certain WLAN only, e.g. identified by HESSID and/or SSID, the message may comprise a field comprising this ID. The field may comprise several WLAN IDs. eNB will then provide the WLAN identifier(s) to UE.

Also, instead of the WLAN Group ID, core network may provide an indication to the eNB, that RABs of a certain QCI may be treated as one group. Thus, the solution is more flexible than the eNB only based solution.

Figure 3:
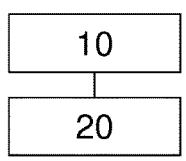
FIG. 3 shows an apparatus according to an embodiment of the invention.
Figure 4:
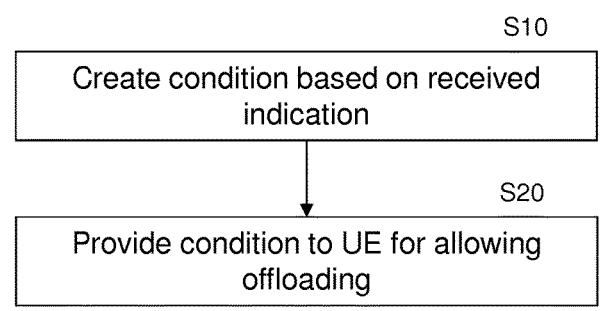
FIG. 4 shows a method according to an embodiment of the invention.

FIG. 3 shows an apparatus according to an embodiment of the invention. The apparatus may be a radio network controller such as a RNC, an eNB, or an element thereof. FIG. 4 shows a method according to an embodiment of the invention. The apparatus according to FIG. 3 may perform the method of FIG. 4 but is not limited to this method. The method of FIG. 4 may be performed by the apparatus of FIG. 3 but is not limited to being performed by this apparatus.

The apparatus comprises creating means 10 and indicating means 20.

The creating means 10 creates a condition based on an indication received from a core device (S10). The indication is comprised in a request to set up or to modify a packet data connection of a user device of a first radio access network of a first technology such as 3GPP. The apparatus provides a radio access bearer of the first technology for the packet data connection of the user device. The condition comprises a condition for offloading the first radio access bearer of the first technology to a second radio access network of a second technology different from the first technology. The second radio access technology may be e.g. WLAN.

The indicating means 20 indicates the condition to the user device (S20). It is intended that the condition is interpreted at the user device such that, if the condition is satisfied, offloading the radio access bearer to a second radio access network of a second technology different from the first technology is either enforced or prevented.

Figure 5:
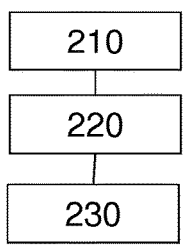
FIG. 5 shows an apparatus according to an embodiment of the invention.
Figure 6:
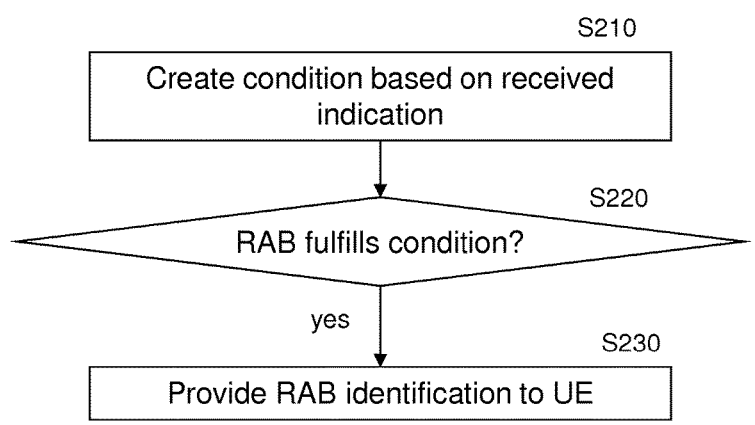
FIG. 6 shows a method according to an embodiment of the invention.

FIG. 5 shows an apparatus according to an embodiment of the invention. The apparatus may be a radio network controller such as a RNC, an eNB, or an element thereof. FIG. 6 shows a method according to an embodiment of the invention. The apparatus according to FIG. 5 may perform the method of FIG. 6 but is not limited to this method. The method of FIG. 6 may be performed by the apparatus of FIG. 5 but is not limited to being performed by this apparatus.

The apparatus comprises creating means 210, checking means 220, and indicating means 230.

The creating means 210 creates a condition based on an indication received from a core device (S210). The indication is comprised in a request to set up or to modify a packet data connection of a user device of a first radio access network of a first technology such as 3GPP. The apparatus provides a first radio access bearer of the first technology for the packet data connection of the user device.

The checking means 220 checks if the radio access bearer fulfills the condition (S220).

If the condition is fulfilled, the indicating means 230 indicates an identification of the first radio access bearer to the user device (S230). According to different embodiments, the user device has to interpret the indication of a radio access bearer either such that this radio access bearer is allowed to be offloaded or that it is not allowed to be offloaded to a second radio access network of a second technology (e.g. WAN) different from the first technology. Also, in some embodiments an additional indication differentiating between allowing offloading of the indicated RAB and not allowing offloading of the indicated RAB is provided.

FIG. 7 shows an apparatus according to an embodiment of the invention. The apparatus may be a user device such as a UE or a terminal, or an element thereof. FIG. 8 shows a method according to an embodiment of the invention. The apparatus according to FIG. 7 may perform the method of FIG. 8 but is not limited to this method. The method of FIG. 8 may be performed by the apparatus of FIG. 7 but is not limited to being performed by this apparatus.

The apparatus comprises checking means 310 and preventing means 320.

The checking means 310 checks if a condition for offloading is fulfilled (S310). The offloading for which the condition is checked comprises an offloading of a radio access bearer of a first radio access network of a first radio access technology to a second radio access network of a second radio access technology different from the first radio access technology. For example, the first technology may be a 3GPP technology (UMTS/LTE), and the second technology may be WLAN. The condition is received for the radio access bearer.

The preventing means 320 prevents the offloading of the first radio access bearer to the second radio access network if the condition is fulfilled (S320).

FIG. 9 shows an apparatus according to an embodiment of the invention. The apparatus may be a user device such as a UE or a terminal, or an element thereof. FIG. 10 shows a method according to an embodiment of the invention. The apparatus according to FIG. 9 may perform the method of FIG. 10 but is not limited to this method. The method of FIG. 10 may be performed by the apparatus of FIG. 9 but is not limited to being performed by this apparatus.

The apparatus comprises checking means 410 and enforcing means 420.

The checking means 410 checks if a condition for offloading is fulfilled (S410). The offloading for which the condition is checked comprises an offloading of a radio access bearer of a first radio access network of a first radio access technology to a second radio access network of a second radio access technology different from the first radio access technology. For example, the first technology may be a 3GPP technology (UMTS/LTE), and the second technology may be WLAN. The condition is received for the radio access bearer.

The enforcing means 420 enforces the offloading of the first radio access bearer to the second radio access network if the condition is fulfilled (S420).

Figure 11:
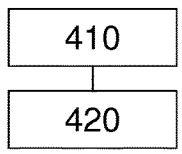
FIG. 11 shows an apparatus according to an embodiment of the invention.
Figure 12:
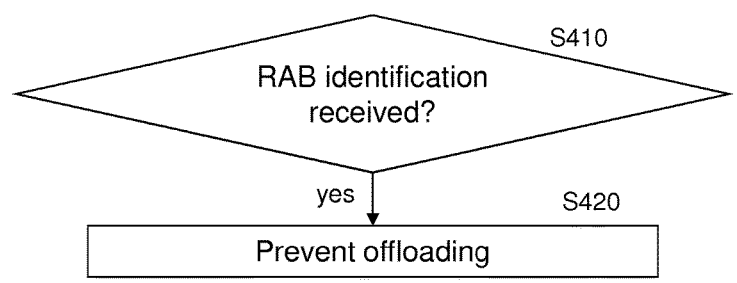
FIG. 12 shows a method according to an embodiment of the invention.

FIG. 11 shows an apparatus according to an embodiment of the invention. The apparatus may be a user device such as a UE or a terminal, or an element thereof. FIG. 12 shows a method according to an embodiment of the invention. The apparatus according to FIG. 11 may perform the method of FIG. 12 but is not limited to this method. The method of FIG. 12 may be performed by the apparatus of FIG. 11 but is not limited to being performed by this apparatus.

The apparatus comprises monitoring means 510 and preventing means 520.

The monitoring means 510 monitors if an identification of a radio access bearer of a first radio access network of a first radio access technology (e.g. 3GPP) is received (S510).

If the identification is received, the preventing means 520 prevents an offloading of the radio access bearer to a second radio access network of a second radio access technology (e.g. WLAN) different from the first radio access technology (S520).

Figure 13:
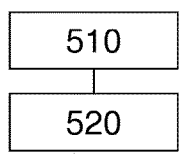
FIG. 13 shows an apparatus according to an embodiment of the invention.
Figure 14:
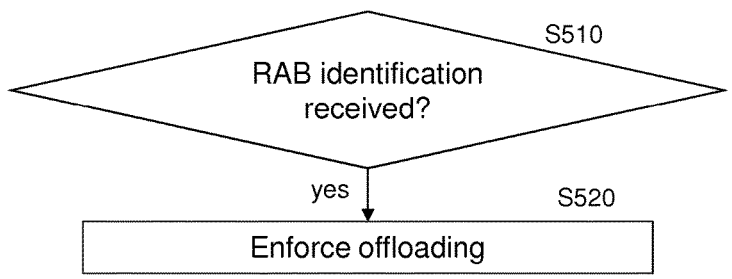
FIG. 14 shows a method according to an embodiment of the invention.

FIG. 13 shows an apparatus according to an embodiment of the invention. The apparatus may be a user device such as a UE or a terminal, or an element thereof. FIG. 14 shows a method according to an embodiment of the invention. The apparatus according to FIG. 13 may perform the method of FIG. 14 but is not limited to this method. The method of FIG. 14 may be performed by the apparatus of FIG. 13 but is not limited to being performed by this apparatus.

The apparatus comprises monitoring means 610 and enforcing means 620.

The monitoring means 610 monitors if an identification of a radio access bearer of a first radio access network of a first radio access technology (e.g. 3GPP) is received (S610).

If the identification is received, the enforcing means 620 enforces an offloading of the radio access bearer to a second radio access network of a second radio access technology (e.g. WLAN) different from the first radio access technology (S620).

Figure 15:
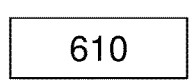
FIG. 15 shows an apparatus according to an embodiment of the invention.
Figure 16:
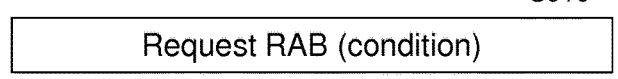
FIG. 16 shows a method according to an embodiment of the invention.

FIG. 15 shows an apparatus according to an embodiment of the invention. The apparatus may be a CN device such as a MME, a SGSN, or a SGW, or an element thereof. FIG. 16 shows a method according to an embodiment of the invention. The apparatus according to FIG. 15 may perform the method of FIG. 16 but is not limited to this method. The method of FIG. 16 may be performed by the apparatus of FIG. 15 but is not limited to being performed by this apparatus.

The apparatus comprises requesting means 610.

The requesting means 610 requests a setup or a modification of a radio access bearer of a first radio access network of a first technology for a packet data network connection (S610). The request comprises an information about a condition for offloading the radio access bearer to a second radio access network of a second technology different from the first technology. For example, the first technology may be a 3GPP technology (UMTS/LTE), and the second technology may be WLAN.

Instead of offloading from a 3GPP network such as a 3G UMTS network or a 4G LTE network described hereinabove, embodiments of the invention may be employed in other radio networks that may allow offloading, such as CDMA, EDGE, WiFi networks, etc. Also, instead of offloading to a WLAN network, the offloading may be to another network such a 3GPP network, CDMA, EDGE, WiFi networks, etc.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they are differently addressed. It does not necessarily mean that they are based on different hardware. That is, each of the entities described in the present description may be based on a different hardware, or some or all of the entities may be based on the same hardware.

A terminal or a user equipment may be a mobile phone, a smart phone, a PDA, a laptop or any other terminal which may be attached to networks of the respective technologies such as LTE and UMTS or GSM. In particular, in some embodiments, the terminal or user equipment may be able to connect simultaneously to both technologies such as to LTE and UMTS or GSM.

According to the above description, it should thus be apparent that exemplary embodiments of the present invention provide, for example a storage means, or a component thereof, an apparatus embodying the same, a method for controlling and/or operating the same, and computer program(s) controlling and/or operating the same as well as mediums carrying such computer program(s) and forming computer program product(s). Furthermore, it should thus be apparent that exemplary embodiments of the present invention provide, for example a partitioner, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. An apparatus, comprising:
a non-transitory computer readable medium having a computer program; and
a controller, wherein the controller causes the apparatus to perform, in response to executing the computer program, operations comprising:
creating a first condition based on a first indication comprised in a request to set up or to modify a packet data connection of a user device of a first radio access network of a first technology, wherein the request is received from a core device, and the first condition comprises a condition for enforcing by the user device an offloading of a first radio access bearer of the first technology to a second radio access network of a second technology different from the first technology in response to the first condition being fulfilled, wherein the first radio access bearer is provided by the apparatus for the packet data connection of the user device;
checking whether the first radio access bearer fulfills the first condition;
creating a second condition based on a second indication received from the core device, the second condition comprises another, different condition from the first condition for inhibiting by the user device offloading of the first radio access bearer of the first technology to the second radio access network in response to the second condition not being fulfilled;
indicating an identification of the first radio access bearer to the user device in response to the first condition being fulfilled; and
indicating the second condition to the user device.

2. The apparatus according to claim 1, wherein the controller causes the apparatus to perform, in response to executing the computer program, operations comprising:
prohibiting the indicating of the identification of the first radio access bearer in response to the first radio access bearer not fulfilling the first condition.

3. The apparatus according to claim 1, wherein:
the first indication comprises an indication of a quality of service class for the packet data connection in the first radio access network, and the first condition is based on the quality of service class; and/or
the first indication comprises a group identification of the first radio access bearer in the first technology network.

4. The apparatus according to claim 1, wherein:
the second indication indicates at least one of the following:
whether the first radio access bearer may be offloaded at all;
whether the first radio access bearer may be offloaded to a specific one of a plurality of technologies including the second technology, each of which being different from the first technology;
whether the first radio access bearer may be offloaded to a specific one of a plurality of radio access networks of the second technology, wherein the plural radio access networks comprise the second radio access network; and
that the first radio access bearer must be offloaded only together with a second radio access bearer of the first technology different from the first radio access bearer.

5. The apparatus according to claim 1, wherein the first indication is comprised in an information element of the request dedicated to the condition.

6. A radio controller comprising an apparatus according to claim 1.

7. An apparatus, comprising:
a non-transitory computer readable medium having a computer program; and
a controller, wherein the controller causes the apparatus to perform, in response to executing the computer program, operations comprising:
checking, at a user equipment, whether a first condition for an offloading a first radio access bearer used by the user equipment of a first radio access network of a first radio access technology to a second radio access network of a second radio access technology different from the first radio access technology is fulfilled, wherein the first condition is received for the first radio access bearer;

responsive to a second condition for the offloading of the first radio access bearer being received, checking at the user equipment whether the second condition for the offloading of the first radio access bearer is fulfilled, wherein the first and second conditions are different;
enforcing at the user equipment the offloading of the first radio access bearer to the second radio access network in response to the first condition being fulfilled; and
inhibiting at the user equipment the offloading of the first radio access bearer to the second radio access network in response to the second condition not being fulfilled.

8. The apparatus according to claim 7, wherein:
the first condition comprises a quality of service class,
the checking checks whether the first radio access bearer has the quality of service class, and
the enforcing enforces the offloading in response to the first radio access bearer having the quality of service class.

9. The apparatus according to claim 7, wherein:
the first condition comprises a group identification;
the checking checks whether the first radio access bearer has the group identification; and
the enforcing enforces the offloading in response to the first radio access bearer having the group identification.

10. The apparatus according to claim 7, wherein the controller causes the apparatus to perform, in response to executing the computer program, operations comprising:
identifying a second radio access bearer of the first technology different from the first radio access bearer and fulfilling the first condition; wherein
the enforcing enforces the offloading of the first radio access bearer and the identified second radio access bearer in response to both of the first radio access bearer and the identified second radio access bearer being allowed to be offloaded.

11. The apparatus according to claim 10, wherein:
the identifying the second radio access bearer identifies each of a set of second radio access bearers, each being different from the first radio access bearer and fulfilling the first condition; wherein
the enforcing enforces the offloading of the first radio access bearer and of each of the second radio access bearers in response to all of the first radio access bearer and the second radio access bearers being allowed to be offloaded.

12. The apparatus according to claim 7, wherein the controller causes the apparatus to perform, in response to executing the computer program, operations comprising:
identifying a second radio access bearer of the first technology different from the first radio access bearer and not fulfilling the second condition; wherein
the inhibiting inhibits the offloading of the first radio access bearer and the second radio access bearer in response to one of the first radio access bearer and the second radio access bearer not fulfilling the second condition.

13. The apparatus according to claim 12, wherein:
the identifying the second radio access bearer identifies each of a set of second radio access bearers, each being different from the first radio access bearer and not fulfilling the second first condition; wherein
the inhibiting inhibits the offloading of the first radio access bearer and of each of the second radio access bearers in response to one of the first radio access bearer and the second radio access bearers not fulfilling the second condition.

14. The apparatus according to claim 12, wherein the controller causes the apparatus to perform, in response to executing the computer program, operations comprising:
monitoring whether the offloading of a third radio access bearer of the first technology fulfilling the first condition is terminated;
identifying, in response to the offloading of the third radio access bearer being terminated, a fourth radio access bearer of the first technology fulfilling the first condition, wherein the fourth radio access bearer is offloaded and different from the third radio access bearer; and
terminating of the offloading of the fourth radio access bearer.

15. The apparatus according to claim 14, wherein:
the identifying the fourth radio access bearer identifies each of a set of plural fourth radio access bearers of the first technology, each being offloaded, fulfilling the first condition, and being different from the third radio access bearer, and
the terminating instructs the terminating of each of the fourth radio access bearers.

16. The apparatus according to claim 7, wherein the second condition comprises at least one of the following:
whether the first radio access bearer may be offloaded at all;
whether the first radio access bearer may be offloaded to a specific one of plural technologies including the second technology, each of which being different from the first technology; and
whether the first radio access bearer may be offloaded to a specific one of plural radio access networks of the second technology, wherein the plural radio access networks comprise the second radio access network.

17. A user equipment comprising an apparatus according to claim 7.

18. The apparatus of claim 7, wherein the inhibiting is performed instead of the enforcing, in response to both the first condition being fulfilled and the second condition not being fulfilled.

19. A method, comprising:
creating a first condition based on a first indication comprised in a request to set up or to modify a packet data connection of a user device of a first radio access network of a first technology, wherein the request is received from a core device, and the first condition comprises a condition for enforcing by the user device offloading of a first radio access bearer of the first technology to a second radio access network of a second technology different from the first technology in response to the first condition being fulfilled, wherein the first radio access bearer is provided by an apparatus performing the method for the packet data connection of the user device;
checking whether the first radio access bearer fulfills the first condition;
creating a second condition based on a second indication received from the core device, the second condition comprises another, different condition from the first condition for inhibiting by the user device offloading of the first radio access bearer of the first technology to the second radio access network in response to the second condition not being fulfilled;
indicating an identification of the first radio access bearer to the user device in response to the first condition being fulfilled; and
indicating the second condition to the user device.

20. A method, comprising:
checking whether a first condition for an offloading a first radio access bearer of a first radio access network of a first radio access technology to a second radio access network of a second radio access technology different from the first radio access technology is fulfilled, wherein the first condition is received for the first radio access bearer, and wherein the first condition comprises a grouping information;
responsive to a second condition for the offloading of the first radio access bearer is received, checking whether the second condition for the offloading of the first radio access bearer is fulfilled, wherein the first and second conditions are different;
enforcing the offloading of the first radio access bearer to the second radio access network in response to the first condition being fulfilled; and
inhibiting the offloading of the first radio access bearer to the second radio access network in response to the second condition not being fulfilled.

* * * * *